United States Patent
Cheng et al.

(10) Patent No.: US 12,143,221 B2
(45) Date of Patent: Nov. 12, 2024

(54) COMMUNICATION METHODS AND APPARATUSES FOR MEDIUM ACCESS CONTROL (MAC) CONTROL ELEMENT (CE) LATENCY CONTROL

(71) Applicant: SHARP KABUSHIKI KAISHA, Sakai (JP)

(72) Inventors: Chien-Chun Cheng, Taipei (TW); Chia-Hao Yu, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 287 days.

(21) Appl. No.: 17/774,647

(22) PCT Filed: Oct. 16, 2020

(86) PCT No.: PCT/CN2020/121417
§ 371 (c)(1),
(2) Date: May 5, 2022

(87) PCT Pub. No.: WO2021/088619
PCT Pub. Date: May 14, 2021

(65) Prior Publication Data
US 2022/0376836 A1    Nov. 24, 2022

Related U.S. Application Data

(60) Provisional application No. 62/932,868, filed on Nov. 8, 2019.

(51) Int. Cl.
*H04L 1/18* (2023.01)
*H04L 1/1812* (2023.01)
*H04L 1/1867* (2023.01)

(52) U.S. Cl.
CPC .......... *H04L 1/1812* (2013.01); *H04L 1/1887* (2013.01)

(58) Field of Classification Search
CPC ............ H04B 7/18513; H04B 7/18519; H04B 7/18523; H04B 7/1853; H04L 1/0025;
(Continued)

(56) References Cited

U.S. PATENT DOCUMENTS 11,356,171 B2 *   6/2022   Xu ..................... H04B 7/18519
11,985,662 B2 *   5/2024   Cheng ................. H04L 1/1812
(Continued)

FOREIGN PATENT DOCUMENTS

CN        109803427 A       5/2019
WO        2019195457 A1    10/2019

OTHER PUBLICATIONS

Asia Pacific Telecom, Discussion on physical layer control procedures for NTN, 3GPP TSG-RAN WG1 Meeting #99, R1-1912246, 3 pages, Nov. 22, 2019.*

(Continued)

*Primary Examiner* — Frank Duong
(74) *Attorney, Agent, or Firm* — ScienBiziP, P.C.

(57) ABSTRACT

A method performed by a UE is provided. The method includes receiving DCI on a PDCCH from a BS, the DCI indicating a PDSCH; receiving a MAC CE command on the PDSCH; determining, according to the DCI, whether a HARQ ACK feedback for a data reception on the PDSCH is needed to be transmitted; and applying, after determining that the HARQ ACK feedback is needed to be transmitted, the MAC CE command after a first slot identified by a first value of n+K0+K1+Np+M, where n is an index of a slot in which the DCI is received, K0 and K1 are slot offsets, Np indicates an approximated delay determined by a TA value, and M indicates a processing delay.

20 Claims, 4 Drawing Sheets

(58) Field of Classification Search
CPC ... H04L 1/0026; H04L 1/0027; H04L 1/1812; H04L 1/1854; H04L 1/1887; H04L 43/0852; H04L 5/0053; H04W 76/14
See application file for complete search history.

(56) References Cited

U.S. PATENT DOCUMENTS

| | | | | |
|---|---|---|---|---|
| 2021/0029658 | A1* | 1/2021 | Mahalingam | H04W 74/0833 |
| 2022/0191898 | A1* | 6/2022 | Sergeev | H04W 72/20 |
| 2022/0239417 | A1* | 7/2022 | Cheng | H04L 1/1835 |
| 2023/0275705 | A1* | 8/2023 | Muruganathan | H04L 1/1822 |
| | | | | 370/329 |

OTHER PUBLICATIONS

Qualcomm Incorporated, Physical Layer Procedures for NTN, 3GPP TSG RAN WG1 #98bis, R1-191114, 4 pages, Oct. 14-20, 2019.*

3GPP TS 38.321, "3rd Generation Partnership Project; Technical Specification Group Radio Access Network; NR; Medium Access Control (MAC) protocol specification (Release 15)", V15.7.0 (Sep. 2019).

3GPP TS 38.213, "3rd Generation Partnership Project; Technical Specification Group Radio Access Network; NR; Physical layer procedures for control (Release 15)", V15.7.0 (Sep. 2019).

3GPP TS 38.133, "3rd Generation Partnership Project; Technical Specification Group Radio Access Network; NR; Requirements for support of radio resource management (Release 15)", V15.7.0 (Sep. 2019).

Sony: "Discussion on delay-tolerant HARQ for NTN", 3GPP Draft; R1-1910748, 3GPP TSG RAN WG1 Meeting #98bis, Chongqing, China, Oct. 14-20, 2019(Oct. 4, 2019).

Mediatek Inc: "Delay-tolerant re-transmission mechanisms in NR-NTN", 3GPP Draft; R1-1904646, 3GPP TSG RAN WG1 Meeting #96bis, Xi'an, China, Apr. 8-Apr. 12, 2019(Apr. 7, 2019).

Oppo: "NTN control procedure for physical layer", 3GPP Draft; R1-1910386, 3GPP TSG RAN WG1 #98bis, Chongqing, China, Oct. 14-20, 2019(Oct. 5, 2019).

Moderator (Ericsson): "Feature lead summary#4 on timing relationship enhancements", 3GPP Draft; R1-2007323, 3GPP TSG-RAN WG1 Meeting #102-e, e-Meeting, Aug. 17-28, 2020(Aug. 28, 2020).

CATT, "Physical layer control procedure enhancement", R1-1910337, 3GPP TSG RAN WG1 Meeting #98bis, Chongqing, China, Oct. 14-20, 2019.

Asia Pacific Telecom, "Discussion on physical layer control procedures for NTN", R1-1910845, 3GPP TSG-RAN WG1 Meeting #98-Bis, Chongqing, China, Oct. 14-20, 2019.

Ericsson, "Feature lead summary #1 on NTN physical layer control procedures", R1-1911565, 3GPP TSG-RAN WG1 Meeting #98bis, Chongqing, China, Oct. 14-20, 2019.

Asia Pacific Telecom, "Discussion on physical layer control procedures for NTN", R1-1912246, 3GPP TSG-RAN WG1 Meeting #99, Reno, USA, Nov. 18-22, 2019.

* cited by examiner

COMMUNICATION METHODS AND APPARATUSES FOR MEDIUM ACCESS CONTROL (MAC) CONTROL ELEMENT (CE) LATENCY CONTROL

CROSS-REFERENCE TO RELATED APPLICATION(S)

The present disclosure is the National Stage of International Application No. PCT/CN2020/121417, filed on Oct. 16, 2020, entitled "COMMUNICATION METHODS AND APPARATUSES FOR MEDIUM ACCESS CONTROL (MAC) CONTROL ELEMENT (CE) LATENCY CONTROL," which claims the benefit of and priority to U.S. Provisional Patent Application No. 62/932,868, filed on Nov. 8, 2019, entitled "Enhancement on MAC CE Latency in NTN," the contents of all of which are hereby fully incorporated herein by reference for all purposes.

FIELD

The present disclosure generally relates to wireless communications, and more specifically, to communication methods and apparatuses for Medium Access Control (MAC) Control Element (CE) latency control.

BACKGROUND

With the tremendous growth in the number of connected devices and the rapid increase in user/network traffic volume, various efforts have been made to improve different aspects of wireless communication for the next-generation wireless communication system, such as fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to communication methods and apparatuses for MAC CE latency control.

According to an aspect of the present disclosure, a communication method performed by a User Equipment (UE) is provided. The communication method including receiving Downlink Control Information (DCI) on a Physical Downlink Control Channel (PDCCH) from a Base Station (BS), the DCI indicating a Physical Downlink Shared Channel (PDSCH); receiving a Medium Access Control (MAC) Control Element (CE) command on the PDSCH; determining, according to the DCI, whether a Hybrid Automatic Repeat reQuest (HARQ) Acknowledgement (ACK) feedback for a data reception on the PDSCH is needed to be transmitted; and applying, after determining that the HARQ ACK feedback is needed to be transmitted, the MAC CE command after a first slot identified by a first value of $n+K0+K1+Np+M$, where n is an index of a slot in which the DCI is received, K0 is a first slot offset between the PDCCH and the PDSCH, K1 is a second slot offset between the PDSCH and a Physical Uplink Control Channel (PUCCH) for transmitting the HARQ ACK feedback, Np indicates an approximated delay determined by a Timing Advance (TA) value of the UE, and M indicates a processing delay of the UE.

According to another aspect of the present disclosure, a UE is provided. The UE includes a memory having computer-readable instructions stored thereon and at least one processor coupled to the memory. The at least one processor is configured to execute the computer-readable instructions to receive DCI on a PDCCH from a BS, the DCI indicating a PDSCH; receive a MAC CE command on the PDSCH; determine, according to the DCI, whether a HARQ ACK feedback for a data reception on the PDSCH is needed to be transmitted; and apply, after determining that the HARQ ACK feedback is needed to be transmitted, the MAC CE command after a first slot identified by a first value of $n+K0+K1+Np+M$, where n is an index of a slot in which the DCI is received, K0 is a first slot offset between the PDCCH and the PDSCH, K1 is a second slot offset between the PDSCH and a PUCCH for transmitting the HARQ ACK feedback, Np indicates an approximated delay determined by a TA value of the UE, and M indicates a processing delay of the UE.

BRIEF DESCRIPTION OF THE DRAWINGS

Aspects of the present disclosure are best understood from the following detailed description when read with the accompanying figures. Various features are not drawn to scale. Dimensions of various features may be arbitrarily increased or reduced for clarity of discussion.

DESCRIPTION

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a particular feature, structure, or characteristic, but not every possible implementation of the present disclosure necessarily includes the particular feature, structure, or characteristic. Further, repeated use of the phrase "in one implementation," "in an example implementation," or "an implementation," do not necessarily refer to the same implementation, although they may. Moreover, any use of phrases like "implementations" in connection with "the present disclosure" are never meant to characterize that all implementations of the present disclosure must include the particular feature, structure, or characteristic, and should instead be understood to mean "at least some implementations of the present disclosure" includes the stated particular feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuitry (ASIC), programmable logic arrays, and/or using one or more Digital Signal Processors (DSPs). Although some of the example implementations disclosed are oriented to software installed and executing on computer hardware, alternative example implementations implemented as firmware or as hardware or combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet), through a Radio Access Network (RAN) established by the BS.

In the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned above.

The BS may be operable to provide radio coverage to a specific geographical area using a plurality of cells included in the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmissions). The BS may communicate with one or more UEs in the radio communication system through the plurality of cells. A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, the UL transmission data should also be configurable, for example, based on the network dynamics of NR. Besides, an SL resource may also be provided in an NR frame to support ProSe services.

Non-Terrestrial Networks (NTN) refer to networks, or segments of networks, using a spaceborne vehicle for transmission, e.g., using Low Earth Orbiting (LEO) satellites and Geostationary Earth Orbiting (GEO) satellites.

In 3GPP Release 16 (Rel-16), some scenarios have been started with key issues and solutions. For example, a transparent GEO satellite network refers to a relay-based NTN, including radio frequency (RF) functions only. The GEO satellites simply perform amplify-and-forward in space. Moreover, a transparent LEO satellite network refers to a relay-based NTN. In this case, the LEO satellites simply perform amplify-and-forward in space. Furthermore, the regenerative LEO satellite network refers to a network architecture, where LEO satellites have full capability of RAN functions as a base station in NR. In this case, UEs are served directly by the satellites.

MAC CE (MAC control elements) are used for control signaling. It provides a faster way to send control signaling than Radio Link Control (RLC)/Radio Resource Control (RRC), with fewer concerns on the restrictions in terms of payload sizes and reliability as offered by physical-layer control signaling, e.g., Physical Downlink Control Channel (PDCCH) or Physical Uplink Control Channel (PUCCH). The MAC layer/entity may insert MAC CEs into the Transport Blocks (TBs) to be transmitted over the transport channels.

There are multiple types of MAC CEs, used for various purposes, for example:

scheduling-related MAC CEs, such as buffer status reports and power headroom reports used to assist UL scheduling, and the configured grant (CG) confirmation MAC CE used when configuring UL semipersistent (SP) scheduling;

random-access-related MAC CEs such as the Cell Radio Network Temporary Identity (C-RNTI) and contention-resolution MAC CEs;

timing-advance MAC CEs to handle timing advance;

activation and deactivation of previously configured components;

DRX-related MAC CEs;

activation/deactivation of Packet Data Convergence Protocol (PDCP) duplication detection; and activation/deactivation of Channel State Information (CSI) reporting and Sounding Reference Signal (SRS) transmission.

MAC CE latency refers to the latency related to MAC CE parsing and, based on the parsing result, further physical-layer processing and configuration if it is needed. In NR, the MAC CE latency is defined from a device (e.g., UE) perspective: the interval between the time of an ACK (acknowledgment) transmission for a PDSCH carrying a MAC CE message/command and the time that the UE applies/executes the MAC CE command carried in the message.

In NTN, due to long propagation delay, the MAC CE latency may be insufficient to cover the delay. To handle this, in one implementation, the following UE behavior in Table 1 is provided.

TABLE 1

When the HARQ-ACK corresponding to a PDSCH carrying a MAC CE command is transmitted in slot n', the corresponding action and the UE assumption on the DL configuration indicated by the MAC CE command shall be applied starting from the first slot that is after slot n' + $XN_{slot}^{subframe, \mu}$ + $K_{offset}$ (X can be determined when the 3GPP specifications are developed).

According to Table 1, scheduling offset $K_{offset}$ is provided for UL transmission timing enhancement. To compensate for a timing advance (TA) command that may shift UL transmission timing too far along in the time domain, the scheduling offset $K_{offset}$ between the scheduling DCI and a scheduled PUSCH, e.g., K2 in NR, or between a scheduled PDSCH and the corresponding HARQ ACK on the PUCCH, e.g., K1 in NR, may be used. The introduction of X is associated with a concern that different MAC CE parsing times for different types of UEs, e.g., Very Small Aperture Terminal (VSAT), handheld, or vehicle-mounted, may be needed.

In addition, due to the long Round Trip Time (RTT) in NTN, the HARQ mechanism may be inefficient for a time-urgent service. To handle this, in one implementation, the enabling/disabling of HARQ ACK feedback may be configurable on a per UE and per HARQ process basis. For example, the NW may configure one or more HARQ processes to a UE, whereas the corresponding HARQ ACK feedback can be enabled or disabled. When the HARQ ACK feedback transmission is enabled (which refers to a HARQ ACK feedback-based operation), the HARQ ACK feedback will be sent by the UE; when disabled (which refers to a HARQ ACK feedback-less operation), the HARQ ACK feedback will not be sent by the UE. This may impact MAC CE latency because the latency may be extended to $XN_{slot}^{subframe,\mu}+K_{offset}$ for NTN, with the value of $N_{slot}^{subframe,\mu}$ referring to the number of slots per subframe for subcarrier spacing configuration $\mu$, but the starting time is still based on the HARQ-ACK corresponding to a MAC CE command.

When the HARQ ACK feedback transmission is disabled on a per UE basis, there may be no ACK timing to be used as a reference starting point for calculating application delay of MAC CE commands. Thus, new start timing may be needed.

On the other hand, when the HARQ ACK feedback transmission is enabled (e.g., the HARQ ACK feedback will be sent by the UE), the start timing for calculating the application delay of MAC CE commands may be later than the time that the NW receives the ACK. Specifically, the gap between the time that the NW receives the ACK and the time the MAC CE is applied by the UE may be more than one propagation delay, which may be up to 270 milliseconds (ms) for GEO and 12 ms for LEO with transparent payloads, due to the use of $K_{offset}$. This long MCE CE latency may break some NR features, e.g., Discontinuous Reception (DRX), CG scheduling, timing-advance control, CSI reporting, or SRS transmission. The reason behind this issue is that the scheduling offset $K_{offset}$ is always greater than (or equal to) the TA value, which is an RTT. This is used to prevent scheduling disorder, e.g., the UE may be asked to transmit the HARQ ACK feedback before receiving any PDSCH data if the new scheduling offset is not long enough.

In addition, for consistency between ACK feedback and ACK feedback-less operations, the same timing for UE to apply a MAC CE command may be considered regardless of HARQ ACK feedback types. If there is no consistency, DL scheduling may be more complicated than an NR Uu interface.

To handle these issues, various features/implementation/examples are proposed in the present disclosure.

Before that, notations used for defining the DL reception timeline at the UE side are provided as follows.

K0 (in the unit of DL slots): the time interval between the PDCCH and the PDSCH scheduled by the PDCCH, K1+$K_{offset}$ (in the unit of DL slots): the time interval between the PDSCH and the PUCCH for HARQ ACK feedback transmission for the PDSCH, TA (in the unit of absolute time), a timing advance value, Tp (in the unit of absolute time), propagation delay.

Figure 1:
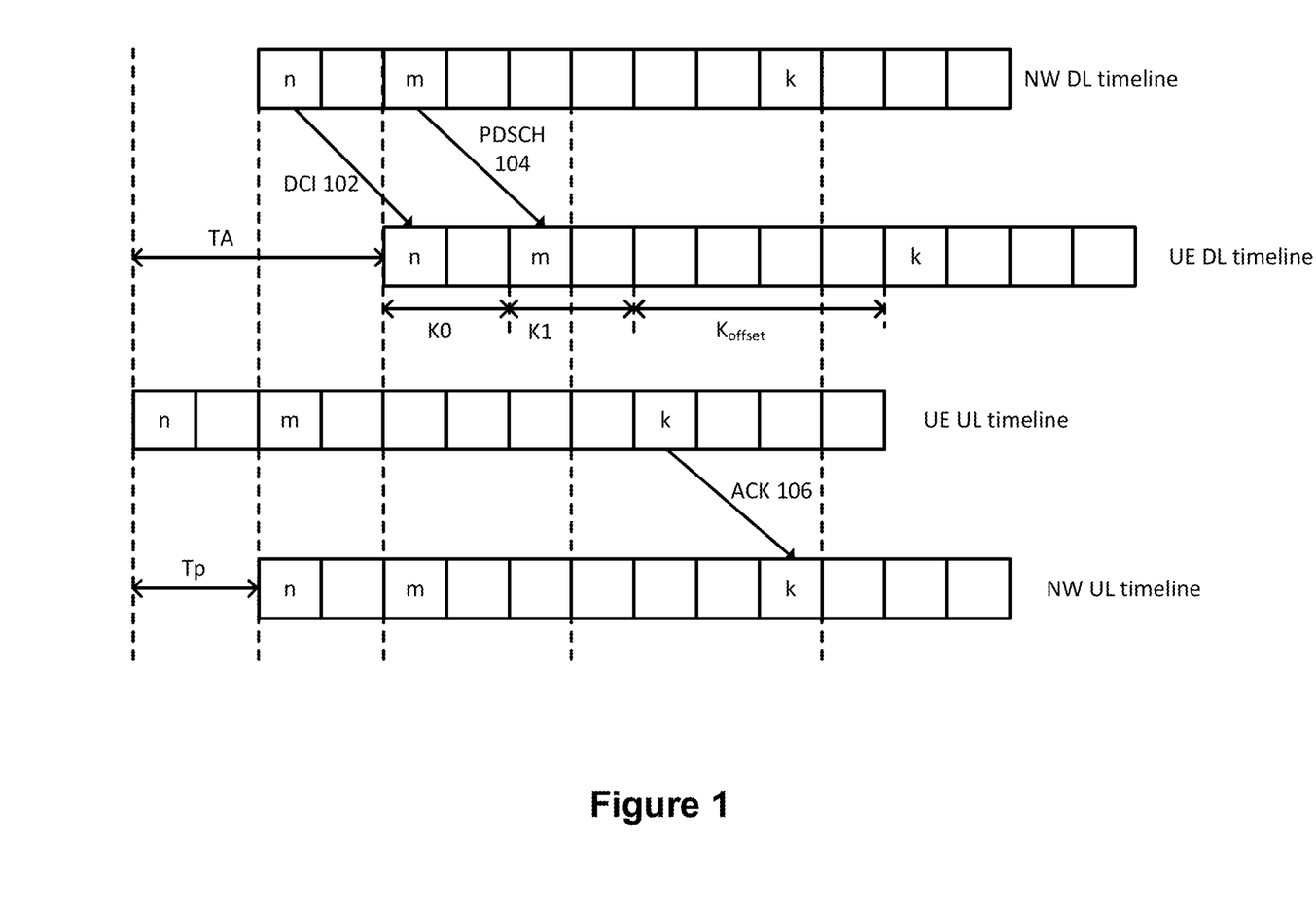
FIG. 1 illustrates a MAC CE scheduling timeline in a transparent—Low Earth Orbiting (LEO) based access Network (NW), in accordance with an implementation of the present disclosure.

FIG. 1 illustrates a MAC CE scheduling timeline in a transparent-LEO-based access NW, in accordance with an implementation of the present disclosure. As illustrated in FIG. 1, in UE DL slot n, the UE receives DCI 102 in a PDCCH that schedules a PDSCH 104 and carries the scheduling offsets K0 and K1. The PDSCH 104 carries at least one MAC CE command.

In UE DL slot m=n+K0, the UE receives the scheduled PDSCH 104. After N_1 OFDM symbols of the processing time for the PDSCH, PDSCH 104 is decoded by the UE, and the corresponding HARQ ACK feedback is being generated.

Then $N_{slot}^{subframe,\mu}$ slot later, e.g., 3 ms, the MAC CE command is parsed, and the corresponding configuration is ready to be applied.

In UE DL or UL slot k=m+K1+$K_{offset}$, the UE transmits the HARQ ACK feedback 106 (e.g., ACK/Negative ACK (NACK)) corresponding to the PDSCH 104 carrying the MAC CE command, if the HARQ ACK feedback transmission is enabled. The transmission of the HARQ ACK feedback 106 in DL or UL slot k may be subject to a TA value.

In one example, in the case of LEO with transparent payload, the propagation delay Tp may be around 12 ms, and the scheduling offset of $K_{offset}$+K1 may be more than 24 ms.

In some situations, the corresponding UL time for the MAC CE command to be applied should not be earlier than the time of receiving PDSCH (e.g., PDSCH 104) after TA compensation; otherwise, some UL procedures, e.g., SP-CSI reporting and SP-SRS transmission, may have to be triggered before receiving the corresponding MAC CE command, which would be non-causal.

When the HARQ ACK feedback corresponding to a PDSCH carrying a MAC CE command is disabled, the following implementations/examples may be applied. The following implementations/examples may be applied when the HARQ ACK feedback transmission is enabled as well.

In one implementation, the UE may apply the MAC CE command after receiving the corresponding DCI. The parsing time for the MAC CE command may be included or not. Based on this principle, if the DCI is received in DL slot n, the MAC CE command may be applied at the time starting from the first slot that is after one of the following UE DL slot numbers (1) to (5):

$$n+K0+XN_{slot}^{subframe,\mu} \tag{1}$$

$$n+K0+Np+XN_{slot}^{subframe,\mu} \tag{2}$$

$$n+K0+K_{offset}+XN_{slot}^{subframe,\mu} \tag{3}$$

$$n+K0+(K_{offset}-TA)+Np+XN_{slot}^{subframe,\mu} \tag{4}$$

$$n+Np+XN_{slot}^{subframe,\mu} \tag{5}$$

where n is an index of a slot in which the DCI is received, K0 is a slot offset between the PDCCH that the UE receives the DCI and the PDSCH scheduled by the PDCCH, K1 is a slot offset between the PDSCH and a PUCCH for transmitting the HARQ ACK feedback, TA is a TA value of the UE, Np indicates an approximated delay determined by the TA value and the product of X and $N_{slot}^{subframe,\mu}$, $XN_{slot}^{subframe,\mu}$, indicates a processing delay (which can also be denoted as "M" in some implementations of the present disclosure) of the UE.

In one implementation, the application/execution of a MAC CE command may be harmonized to be the same for the HARQ-ACK feedback-based and HARQ-ACK feedback-less operation. Denoting the slot timing for DCI reception as slot n, the MAC CE command may be applied by the UE starting from slot $n+K0+Np+XN_{slot}^{subframe,\mu}$, where K0, Np, and $XN_{slot}^{subframe,\mu}$ follow the definition above.

In one implementation, Np may be either ($K_{offset}$/2) or (common TA value)/2. It is noted that $XN_{slot}^{subframe,\mu}$ is to take into account factors such as PDSCH decoding latency. In this sense, its value is small compared to $K_{offset}$. In one example, $XN_{slot}^{subframe,\mu}$ may be a single-digit value. In another, the value of $XN_{slot}^{subframe,\mu}$ may be zero.

In one implementation, the application/execution delay of a MAC CE command may be different for HARQ-feedback-based and HARQ-less operations/transmissions. Denoting the slot timing for DCI reception as slot n, for HARQ-feedback-based transmission, the application/execution time of a MAC CE command may follow one of the slot numbers (1) to (5):

$$n+K0+XN_{slot}^{subframe,\mu} \quad (1)$$

$$n+K0+Np+XN_{slot}^{subframe,\mu} \quad (2)$$

$$n+K0+K_{offset}+XN_{slot}^{subframe,\mu} \quad (3)$$

$$n+K0+(K_{offset}-TA)+Np+XN_{slot}^{subframe,\mu} \quad (4)$$

$$n+Np+XN_{slot}^{subframe,\mu} \quad (5)$$

In one implementation, the application/execution time of a MAC CE command may be $n'+XN_{slot}^{subframe,\mu}+K_{offset}$, where n' denotes the HARQ ACK transmission time corresponding to the PDSCH carrying an associated MAC CE command. For HARQ-less transmissions, the application/execution time of a MAC CE command may also follow one of the examples (1) to (5) disclosed above. For example, the UE may apply the MAC CE command in slot $n+K0+Np+XN_{slot}^{subframe,\mu}$ (if example (2) is adopted). The HARQ-less transmission may indicate a per-UE based HARQ-less operation or a per-HARQ-process based operation. In a per-UE based HARQ-less operation, for example, RRC signaling may be used to indicate to the UE that the HARQ ACK feedback is not needed to be performed, except for some specifically defined cases/messages or for some preserved HARQ process IDs. In a per-HARQ-process based HARQ-less operation, RRC signaling may be used to indicate a set of HARQ process IDs to a UE. When the set of HARQ process IDs are indicated in, for example, DCI, HARQ ACK feedback is not required.

A UE may apply a MAC CE command in the first (upcoming) slot that is after slot X'. For example, in the cases that the HARQ ACK feedback transmission is disabled or enabled, the value X' may be one of the following values (1) to (7):

$$n+K0+XN_{slot}^{subframe,\mu} \quad (1)$$

$$n+K0+Np+XN_{slot}^{subframe,\mu} \quad (2)$$

$$n+K0+K_{offset}+XN_{slot}^{subframe,\mu} \quad (3)$$

$$n+K0+(K_{offset}-TA)+Np+XN_{slot}^{subframe,\mu} \quad (4)$$

$$n+Np+XN_{slot}^{subframe,\mu} \quad (5)$$

$$n+K0+K_{offset}+XN_{slot}^{subframe,\mu} \quad (6)$$

$$n+K0+(K_{offset}-TA)+Np+XN_{slot}^{subframe,\mu} \quad (7)$$

where the value of X related to the MAC CE parsing time that may be X=1 or X=0 or other values configured by the NW, and Np refers to an approximation for the propagation delay Tp which can be provided by the NW by at least one of the following manners (1) to (6):

(1) Np=$\lceil K_{offset}/2 \rceil$, where $\lceil\ \rceil$ refers to a ceiling function;
(2) Np=$\lceil$(the current TA value)/2$\rceil$;
(3) Np=$\lceil$(the common TA value)/2$\rceil$; the common TA value may be broadcast in SI
(4) Np is approximated by RTT, e.g., with $K_{offset}$, the current TA value, or the common TA value;
(5) Np is configured via RRC, broadcasted via system information (SI), or indicated via DCI;
(6) Np is the maximum propagation delay based on the type of the serving satellite, e.g., LEO, GEO with transparent, or with regenerative payloads, provided via SI, e.g., Public Land Mobile Network (PLMN).

Timing for SCell Activation or Deactivation

In one implementation, with reference to slots for PUCCH transmissions, when a UE receives in a PDSCH an activation (MAC CE) command for a secondary cell ending in slot n+K0, the UE applies the corresponding actions to apply this MAC CE command no later than the minimum requirement and no earlier than the first slot that is after one of the following UE DL slot number X'.

PUCCH Power Control

In one implementation, if a UE transmits a PUCCH on an active UL Bandwidth Part (BWP) in the primary cell using PUCCH power control adjustment state, the UE may determine the PUCCH transmission power based on the parameters $P_{o\_PUCCH}$ and PL, associated with spatial relation information of the PUCCH provided by an RRC Information Element (IE) pucch-SpatialRelationInfoId.

In one implementation, if the UE is provided more than one value for pucch-SpatialRelationInfoId and the UE receives an activation (MAC CE) command indicating a value of pucch-SpatialRelationInfoId, the UE may determine the p0-PUCCH-Value value through the link to a corresponding p0-PUCCH-Id index provided by the activated pucch-SpatialRelationInfoId. The UE may apply the activation command in the first slot that is after slot X'.

Spatial Setting for a PUCCH Transmission

In one implementation, if the UE is provided with multiple values for pucch-SpatialRelationInfo, the UE may determine a spatial setting for the PUCCH transmission provided by a MAC CE command. The UE applies corresponding actions in the MAC CE command and a corresponding setting for a spatial domain filter to transmit PUCCH in the first slot that is after slot X'.

Semi-Persistent ZP CSI-RS

In one implementation, for a UE configured with a list of Zero Power (ZP)-CSI-RS-resource-set (e.g., which is corresponding to an IE denoted as ZP-CSI-RS-ResourceSet(s)) provided by higher layer parameter sp-ZP-CSI-RS-ResourceSetsToAddModList, at least one of the following actions (1) and (2) may be performed:

(1) when the HARQ-ACK corresponding to the PDSCH carrying the activation command for ZP CSI-RS resource(s) is transmitted or generated, the corresponding action and the UE assumption on the PDSCH resource element (RE) mapping corresponding to the activated ZP CSI-RS resource(s) shall be applied starting from the first slot that is after slot X'.

(2) when the HARQ-ACK corresponding to the PDSCH carrying the deactivation command for activated ZP CSI-RS resource(s) is transmitted or generated, the corresponding action and the UE assumption on cessation of the PDSCH RE mapping corresponding to the deactivated ZP CSI-RS resource(s) shall be applied at the time starting from the first slot that is after slot X'.

Antenna Ports Quasi Co-Location

In one implementation, the UE may receive an activation command, used to map up to 8 TCI (Transmission Configuration Indication) states to the codepoints of the DCI field 'Transmission Configuration Indication.' When the HARQ ACK corresponding to the PDSCH carrying the activation command is transmitted or generated, the indicated mapping between TCI states and codepoints of the DCI field 'Transmission Configuration Indication' may be applied at the time starting from the first slot that is after slot X'.

Aperiodic CSI-RS

In one implementation, when the number of configured CSI triggering states in CSI-AperiodicTriggerStateList is greater than $2^{N_{TS}}-1$, where $N_{TS}$ is the number of bits in the DCI CSI request field configured by higher layers, the UE receives a sub selection indication, used to map up to $2^{N_{TS}}-1$ trigger states to the codepoints of the CSI request field in DCI.

When the HARQ ACK corresponding to the PDSCH carrying the subselection indication is transmitted or generated, the corresponding action and UE assumption on the mapping of the selected CSI trigger state(s) to the codepoint(s) of the DCI CSI request field may be applied at the time starting from the first slot that is after slot X'.

Semi-Persistent CSI-RS Reporting

In one implementation, for semi-persistent reporting on a PUCCH, the PUCCH resource used for transmitting the CSI report may be configured by an IE reportConfigType. Semi-persistent reporting on PUCCH may be activated by an activation (MAC CE) command, which selects one of the semi-persistent Reporting Settings for use by the UE on the PUCCH. When the HARQ ACK feedback corresponding to the PDSCH carrying the activation command is transmitted or generated, the indicated semi-persistent Reporting Setting may be applied at the time starting from the first slot that is after slot X'.

Semi-Persistent CSI-RS Resource Setting

In one implementation, for a UE configured with CSI resource setting(s) where the higher layer parameter resourceType set to 'semiPersistent,' at least one of the following actions (1) and (2) may be applied:

(1) when a UE receives an activation command, for CSI-RS resource set(s) for channel measurement and CSI-Interference Measurement (IM)/Non-Zero Power (NZP) CSI-RS resource set(s) for interference measurement associated with configured CSI resource setting(s), and when the HARQ ACK corresponding to the PDSCH carrying the selection command is transmitted or generated, the corresponding actions and the UE assumptions (including QCL assumptions provided by a list of reference to TCI-State's, one per activated resource) on CSI-RS/CSI-IM transmission corresponding to the configured CSI-RS/CSI-IM resource configuration(s) may be applied at the time starting from the first slot that is after slot X'.

(2) when a UE receives a deactivation (MAC CE) command for activated CSI-RS/CSI-IM resource set(s) associated with configured CSI resource setting(s), and when the HARQ-ACK corresponding to the PDSCH carrying the deactivation command is transmitted or generated, the corresponding actions and UE assumption on cessation of CSI-RS/CSI-IM transmission corresponding to the deactivated CSI-RS/CSI-IM resource set(s) may be applied at the time starting from the first slot that is after slot X'.

UE Sounding Procedure

In one implementation, for a UE configured with one or more SRS resource configuration(s), and when the higher layer parameter resourceType in the IE SRS-Resource is set to 'semi-persistent,' at least one of the following actions (1) and (2) may be applied:

(1) when the UE receives an activation command (e.g., via a MAC CE) for an SRS resource, and when the HARQ-ACK corresponding to the PDSCH carrying the activation command is transmitted or generated, the corresponding actions and the UE assumptions on SRS transmission corresponding to the configured SRS resource set may be applied starting from the first slot that is after slot X'. The activation command also contains spatial relation assumptions provided by a list of references to reference signal IDs, one per element of the activated SRS resource set.

(2) when a UE receives a deactivation (MAC CE) command for an activated SRS resource set, and when the HARQ-ACK corresponding to the PDSCH carrying the deactivation command is transmitted or generated, the corresponding actions and UE assumption on cessation of SRS transmission corresponding to the deactivated SRS resource set may be applied at the time starting from the first slot that is after slot X'.

Figure 2:
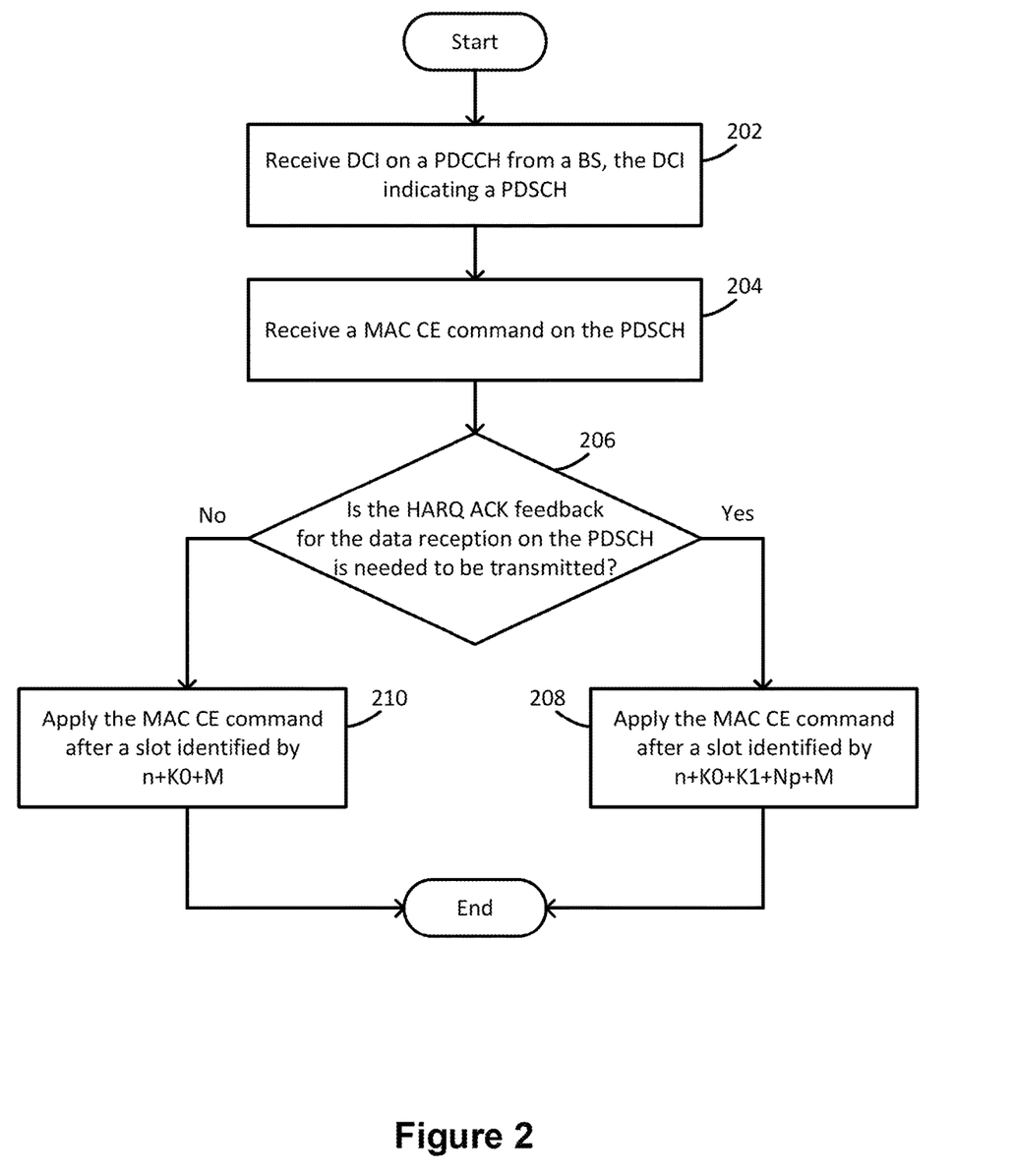
FIG. 2 illustrates a flowchart for a communication method performed by a UE for MAC CE latency control.

FIG. 2 illustrates a flowchart for a communication method performed by a UE for MAC CE latency control.

In action 202, the UE may receive DCI on a PDCCH from a BS, where the DCI indicates/schedules a PDSCH.

In one implementation, the DCI may be received from the BS via an NTN. For example, a transparent GEO satellite network may be used to relay the DCI from the BS to the UE.

In action 204, the UE may receive a MAC CE command on the PDSCH.

In action 206, the UE may determine, according to the DCI, whether a HARQ ACK feedback for data reception on the PDSCH is needed to be transmitted.

In action 208, if the HARQ ACK feedback is needed to be transmitted (e.g., HARQ ACK feedback transmission is enabled), the UE may apply the MAC CE command after a slot identified by n+K0+K1+Np+M, where n is an index of a slot in which the DCI is received, K0 is a first slot offset between the PDCCH and the PDSCH, K1 is a second slot offset between the PDSCH and a PUCCH for transmitting the HARQ ACK feedback, Np indicates an approximated delay determined by a TA value of the UE, and M indicates a processing delay of the UE. For example, after the UE determines that the HARQ ACK feedback is needed to be transmitted, the UE may apply the MAC CE command in the first (upcoming) slot after the identified slot n+K0+K1+Np+M.

In one implementation, the value of Np is $\lceil$ the TA value/P $\rceil$, where P is a positive number larger than 1, and $\lceil \ \rceil$ refers to a ceiling function. In one implementation, P is 2. In one implementation, the TA value may be the latest UE-specific TA value applied by the UE before the UE applies the MAC CE command. In one implementation, the TA value may be a cell-specific TA value that is included in system information broadcast by the BS.

In one implementation, the processing delay may be determined by the numerology of the PUCCH. For example, the processing delay may be determined by $XN_{slot}^{subframe,\mu}$, where $N_{slot}^{subframe,\mu}$ represents the number of slots per subframe for subcarrier spacing configuration μ, and X may be 1 or 0. The value of "M" described in actions 208 and 210 may be determined as the product of X and $N_{slot}^{subframe,\mu}$, i.e., $XN_{slot}^{subframe,\mu}$.

In one implementation, the processing delay may be configured by the BS as 3 milliseconds (ms) or zero ms.

In action 210, if the HARQ ACK feedback is not needed to be transmitted (e.g., HARQ ACK feedback transmission is disabled), the UE may apply the MAC CE command after a slot identified by n+K0+M. For example, after the UE determines that the HARQ ACK feedback is not needed to be transmitted, the UE may apply the MAC CE command in the first (upcoming) slot after the slot identified by n+K0+M.

Figure 3:
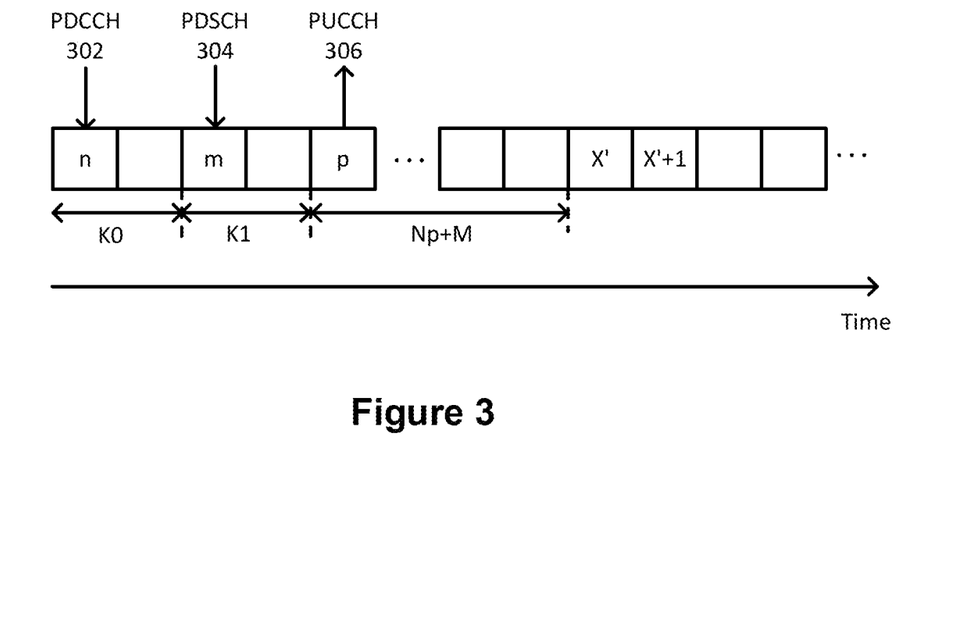
FIG. 3 is a schematic diagram illustrating the timing of applying a MAC CE command by a UE in the case that HARQ ACK feedback transmission is enabled.

FIG. 3 is a schematic diagram illustrating the timing of applying a MAC CE command by a UE in the case that HARQ ACK feedback transmission is enabled.

As illustrated in FIG. 3, the UE may receive PDCCH 302 in slot n, where the PDCCH 302 carries the information (e.g., DCI) that indicates or schedules PDSCH 304. In slot m, the UE may receive a MAC CE command on the scheduled PDSCH 304. The slot offset between slot n and slot m is determined by parameter K0.

In slot p, the UE may transmit a HARQ ACK feedback for the data reception on the PDSCH 304 to the BS. For example, the HARQ ACK feedback may be an ACK when the data reception on the PDSCH 304 is successful, or a NACK when the data reception on the PDSCH 304 is not successful. The slot offset between slot m and slot p is determined by parameter K1.

Then, the UE may apply the MAC CE command after slot X'. As illustrated in FIG. 3, the MAC CE command may be applied/executed by the UE in slot X'+1. As described previously, the value X' may be one of the following values (1) to (7):

$$n+K0+XN_{slot}^{subframe,\mu} \quad (1)$$

$$n+K0+Np+XN_{slot}^{subframe,\mu} \quad (2)$$

$$n+K0+K_{offset}+XN_{slot}^{subframe,\mu} \quad (3)$$

$$n+K0+(K_{offset}-TA)+Np+XN_{slot}^{subframe,\mu} \quad (4)$$

$$n+Np+XN_{slot}^{subframe,\mu} \quad (5)$$

$$n+K0+K_{offset}+XN_{slot}^{subframe,\mu} \quad (6)$$

$$n+K0+(K_{offset}-TA)+Np+XN_{slot}^{subframe,\mu} \quad (7)$$

where the value of $XN_{slot}^{subframe,\mu}$ may be denoted as "M," and Np may be determined by at least one of the following manners (1) to (6):

(1) $Np=\lceil K_{offset}/2 \rceil$, where $\lceil \; \rceil$ refers to a ceiling function;
(2) $Np=\lceil$(the current TA value)/2$\rceil$;
(3) $Np=\lceil$(the common TA value)/2$\rceil$; the common TA value may be broadcast in SI);
(4) Np is approximated by RTT, e.g., with $K_{offset}$, the current TA value, or the common TA value;
(5) Np is configured via RRC, broadcasted via system information (SI), or indicated via DCI;
(6) Np is the maximum propagation delay based on the type of the serving satellite, e.g., LEO, GEO with transparent, or with regenerative payloads, provided via SI, e.g., PLMN.

Figure 4:
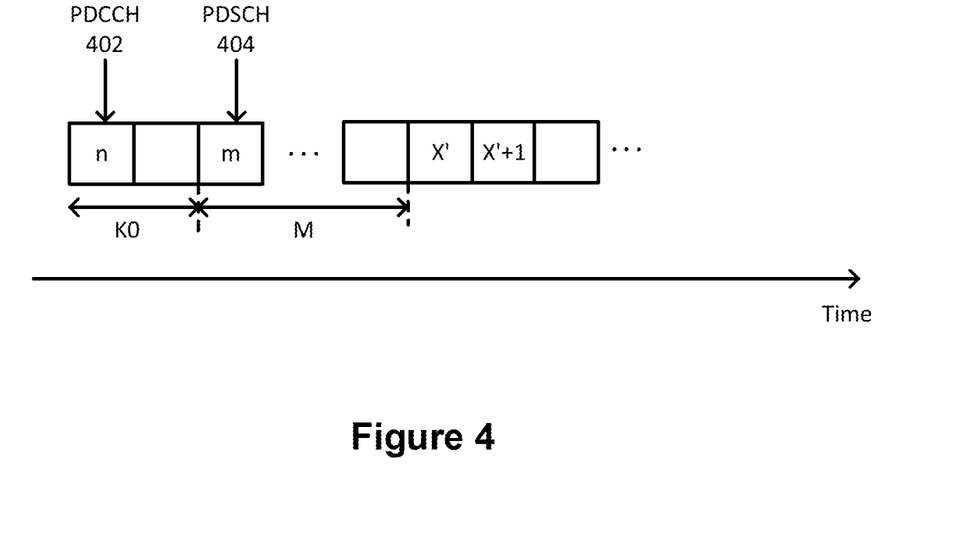
FIG. 4 is a schematic diagram illustrating the timing of applying a MAC CE command by a UE in the case that HARQ ACK feedback transmission is disabled.

FIG. 4 is a schematic diagram illustrating the timing of applying a MAC CE command by a UE in the case that HARQ ACK feedback transmission is disabled.

As illustrated in FIG. 4, the UE may receive PDCCH 402 in slot n, where the PDCCH 402 carries information (e.g., DCI) that indicates or schedules PDSCH 404. In slot m, the UE may receive a MAC CE command on the scheduled PDSCH 404. The slot offset between slot n and slot m is determined by parameter K0.

In the implementation illustrated in FIG. 4, the UE may not transmit the HARQ ACK feedback for the data reception on the PDSCH 404 because the HARQ ACK feedback transmission for the PDSCH 404 is disabled. In this situation, the UE may apply the MAC CE command received on the PDSCH 404 after slot X'=n+K0+M, where $M=XN_{slot}^{subframe,\mu}$. For example, the MAC CE command may be applied/executed by the UE in slot X'+1, as illustrated in FIG. 4.

The following disclosure may be used to further elaborate the terms, examples, implementations, actions, behaviors, alternatives, aspects, or examples described herein:

Cell: Radio network object that can be uniquely identified by a User Equipment from a (cell) identification that is broadcasted over a geographical area from one UTRAN Access Point. A Cell is either Frequency Division Duplex (FDD) or Time Division Duplex (TDD) mode.

Serving Cell: For a UE in RRC_CONNECTED not configured with Carrier Aggregation (CA)/Dual Connectivity (DC), there is only one serving cell comprising of the primary cell. For a UE in RRC_CONNECTED configured with CA/DC, the term 'serving cells' is used to denote the set of cells comprising of the Special Cell(s) and all secondary cells.

HARQ: A functionality ensures delivery between peer entities at Layer 1 (i.e., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each HARQ entity supports a parallel (number) of the DL and UL HARQ processes.

Hybrid automatic repeat request acknowledgment (HARQ-ACK): A HARQ-ACK information bit value of 0 represents a negative acknowledgment (NACK) while a HARQ-ACK information bit value of 1 represents a positive acknowledgment (ACK).

Timer: A MAC entity can setup one or more timers for individual purposes, for example, triggering some uplink signaling retransmission or limiting some uplink signaling retransmission period. A timer is running once it is started, until it is stopped or until it expires; otherwise, it is not running. A timer can be started if it is not running or restarted if it is running. A Timer is always started or restarted from its initial value. The initial value can be, but is not limited to, configured by the gNB via downlink RRC signaling.

BWP: A subset of the total cell bandwidth of a cell is referred to as a Bandwidth Part (BWP), and Bandwidth Adaptation (BA) is achieved by configuring the UE with BWP(s) and telling the UE which of the configured BWPs is currently the active one. To enable BA on the PCell, the gNB configures the UE with UL and DL BWP(s). To enable BA on SCells in case of CA, the gNB configures the UE with DL BWP(s) at least (i.e., there may be none in the UL). For the PCell, the initial BWP is the BWP used for initial access. For the SCell(s), the initial BWP is the BWP configured for the UE to first operate at SCell activation. UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon MAC-activation of an SCell.

PDCCH: In the downlink, the gNB can dynamically allocate resources to UEs via the C-RNTI/Modulation and Coding Scheme (MCS)-C-RNTI/Configured Scheduling (CS)-RNTI on PDCCH(s). A UE always monitors the PDCCH(s) in order to find possible assignments when its downlink reception is enabled (activity governed by DRX when configured). When CA is configured, the same C-RNTI applies to all serving cells.

PDSCH/PUSCH: The PDCCH can be used to schedule DL transmissions on PDSCH and UL transmissions on PUSCH.

Transport Block: The data from the upper layer (or MAC) given to the physical layer is basically referred to as a transport block.

Figure 5:
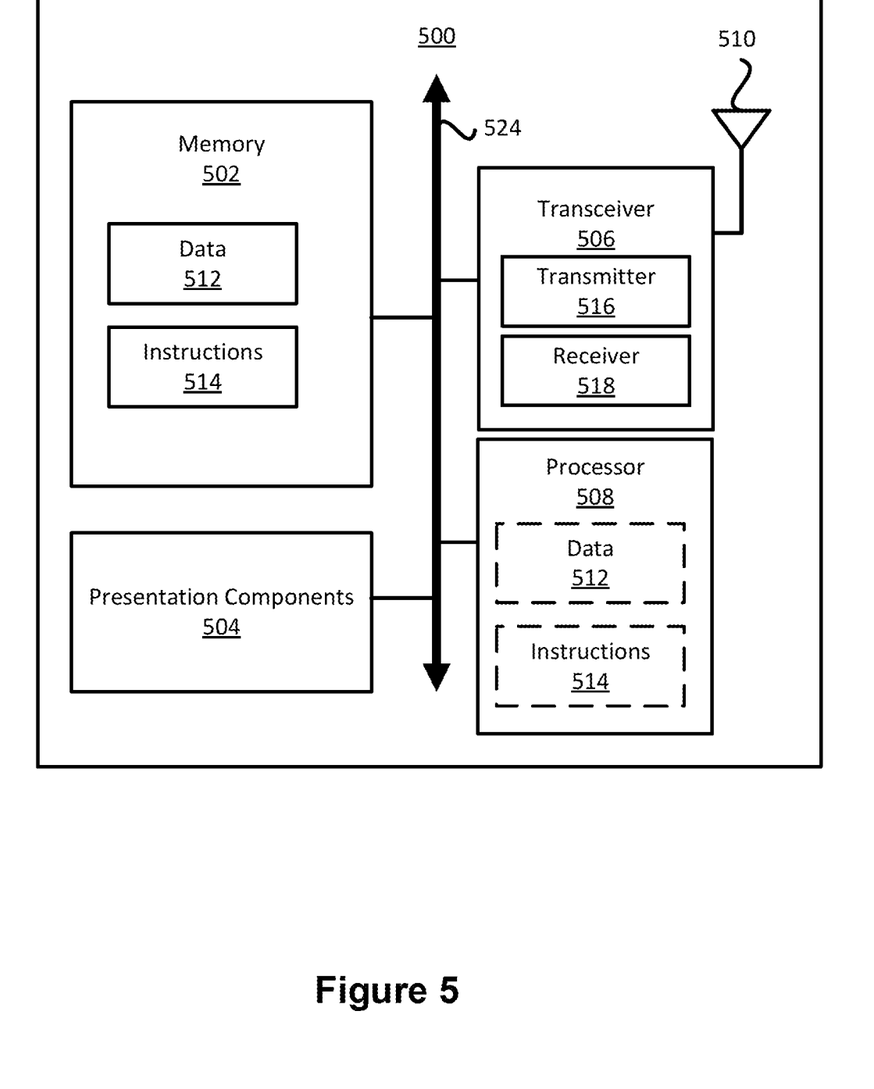
FIG. 5 illustrates a block diagram of a node for wireless communication, in accordance with various aspects of the present disclosure.

FIG. 5 illustrates a block diagram of a node 500 for wireless communication, in accordance with various aspects of the present disclosure. As illustrated in FIG. 5, the node 500 may include a transceiver 506, a processor 508, a memory 502, one or more presentation components 504, and at least one antenna 510. The node 500 may also include an RF spectrum band module, a BS communications module, a network communications module, a system communications management module, Input/Output (I/O) ports, I/O components, and a power supply (not explicitly illustrated in FIG. 5). Each of these components may be in communication with each other, directly or indirectly, over one or more buses 524. In one implementation, the node 500 may be a UE or a BS that performs various functions described herein, for example, with reference to FIGS. 1 through 4.

The transceiver 506 having a transmitter 516 (e.g., transmitting/transmission circuitry) and a receiver 518 (e.g., receiving/reception circuitry) may be configured to transmit and/or receive time and/or frequency resource partitioning information. In one implementation, the transceiver 506 may be configured to transmit in different types of subframes and slots, including, but not limited to, usable, non-usable and flexibly usable subframes and slot formats. The transceiver 506 may be configured to receive data and control channels.

The node 500 may include a variety of computer-readable media. Computer-readable media can be any available media that can be accessed by the node 500 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information such as computer-readable instructions, data structures, program modules or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal. Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared, and other wireless media. Combinations of any of the above should also be included within the scope of computer-readable media.

The memory 502 may include computer storage media in the form of volatile and/or non-volatile memory. The memory 502 may be removable, non-removable, or a combination thereof. For example, the memory 502 may include solid-state memory, hard drives, optical-disc drives, etc. As illustrated in FIG. 5, the memory 502 may store computer-readable and/or computer-executable instructions 514 (e.g., software codes) that are configured to, when executed, cause the processor 508 to perform various functions described herein, for example, with reference to FIGS. 1 through 4. Alternatively, the instructions 514 may not be directly executable by the processor 508 but may be configured to cause the node 500 (e.g., when compiled and executed) to perform various functions described herein.

The processor 508 (e.g., having processing circuitry) may include an intelligent hardware device, a Central Processing Unit (CPU), a microcontroller, an ASIC, etc. The processor 508 may include memory. The processor 508 may process the data 512 and the instructions 514 received from the memory 502, and information through the transceiver 506, the baseband communications module, and/or the network communications module. The processor 508 may also process information to be sent to the transceiver 506 for transmission through the antenna 510, to the network communications module for transmission to a CN.

One or more presentation components 504 may present data indications to a person or other devices. Examples of presentation components 504 may include a display device, speaker, printing component, vibrating component, etc.

From the present disclosure, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described above. Still, many rearrangements, modifications, and substitutions are possible without departing from the scope of the present disclosure.

What is claimed is:

1. A communication method performed by a User Equipment (UE), the communication method comprising:
receiving Downlink Control Information (DCI) on a Physical Downlink Control Channel (PDCCH) from a Base Station (BS), the DCI indicating a Physical Downlink Shared Channel (PDSCH);
receiving a Medium Access Control (MAC) Control Element (CE) command on the PDSCH;
determining, according to the DCI, whether a Hybrid Automatic Repeat reQuest (HARQ) Acknowledgement (ACK) feedback for a data reception on the PDSCH is needed to be transmitted; and
applying, after determining that the HARQ ACK feedback is needed to be transmitted, the MAC CE command after a first slot identified by a first value of n+K0+K1+Np+M, where n is an index of a slot in which the DCI is received, K0 is a first slot offset between the PDCCH and the PDSCH, K1 is a second slot offset between the PDSCH and a Physical Uplink Control Channel (PUCCH) for transmitting the HARQ ACK feedback, Np indicates an approximated delay determined by a Timing Advance (TA) value of the UE, and M indicates a processing delay of the UE.

2. The communication method according to claim 1, wherein Np is ⌈ the TA value/P ⌉, where P is a positive number larger than 1 and ⌈ ⌉ refers to a ceiling function.

3. The communication method according to claim 2, wherein P is 2.

4. The communication method according to claim 1, wherein the TA value is a latest UE-specific TA value applied by the UE before the UE applies the MAC CE command.

5. The communication method according to claim 1, wherein the TA value is a cell-specific TA value that is included in system information broadcast by the BS.

6. The communication method according to claim 1, wherein the processing delay is configured by the BS as 3 milliseconds (ms) or zero.

7. The communication method according to claim 1, wherein the processing delay is determined by a numerology of the PUCCH.

8. The communication method according to claim 1, wherein after the UE determines that the HARQ ACK feedback is needed to be transmitted, the MAC CE command is applied in a first upcoming slot after the first slot.

9. The communication method according to claim 1, further comprising:
applying, after determining that the HARQ ACK feedback is not needed to be transmitted, the MAC CE command after a second slot identified by a second value of n+K0+M,
wherein the MAC CE command is applied in a first upcoming slot after the second slot.

10. The communication method according to claim 1, wherein the DCI is received from the BS via a Non-Terrestrial Network (NTN).

11. A User Equipment (UE) comprising:
a memory having computer-readable instructions stored thereon; and
at least one processor coupled to the memory, the at least one processor being configured to execute the computer-readable instructions to cause the UE to:
receive Downlink Control Information (DCI) on a Physical Downlink Control Channel (PDCCH) from a Base Station (BS), the DCI indicating a Physical Downlink Shared Channel (PDSCH);
receive a Medium Access Control (MAC) Control Element (CE) command on the PDSCH;
determine, according to the DCI, whether a Hybrid Automatic Repeat reQuest (HARQ) Acknowledgement (ACK) feedback for a data reception on the PDSCH is needed to be transmitted; and
apply, after determining that the HARQ ACK feedback is needed to be transmitted, the MAC CE command after a first slot identified by a first value of n+K0+K1+Np+M, where n is an index of a slot in which the DCI is received, K0 is a first slot offset between the PDCCH and the PDSCH, K1 is a second slot offset between the PDSCH and a Physical Uplink Control Channel (PUCCH) for transmitting the HARQ ACK feedback, Np indicates an approximated delay determined by a Timing Advance (TA) value of the UE, and M indicates a processing delay of the UE.

12. The UE according to claim 11, wherein Np is ⌈ the TA value/P ⌉, where P is a positive number larger than 1 and ⌈ ⌉ refers to a ceiling function.

13. The UE according to claim 12, wherein P is 2.

14. The UE according to claim 11, wherein the TA value is a latest UE-specific TA value applied by the UE before the UE applies the MAC CE command.

15. The UE according to claim 11, wherein the TA value is a cell-specific TA value that is included in system information broadcast by the BS.

16. The UE according to claim 11, wherein the processing delay is configured by the BS as 3 milliseconds (ms) or zero.

17. The UE according to claim 11, wherein the processing delay is determined by a numerology of the PUCCH.

18. The UE according to claim 11, wherein after the UE determines that the HARQ ACK feedback is needed to be transmitted, the MAC CE command is applied in a first upcoming slot after the first slot.

19. The UE according to claim 11, wherein the at least one processor is furhter configured to execute the computer-readable instructions to cause the UE to:
apply, after determining that the HARQ ACK feedback is not needed to be transmitted, the MAC CE command after a second slot identified by a second value of n+K0+M,
wherein the MAC CE command is applied in a first upcoming slot after the second slot.

20. The UE according to claim 11, wherein the DCI is received from the BS via a Non-Terrestrial Network (NTN).

* * * * *